United States Patent
Murakami

[11] Patent Number: 6,058,259
[45] Date of Patent: May 2, 2000

[54] METHOD AND APPARATUS FOR AUTOMATICALLY GENERATING SOLID MODEL AND COMPUTER READABLE STORAGE MEDIUM

[75] Inventor: Tamotsu Murakami, Tokyo, Japan

[73] Assignee: Fujitsu Limited, Kawasaki, Japan

[21] Appl. No.: 09/001,193

[22] Filed: Dec. 30, 1997

[30] Foreign Application Priority Data

Jan. 9, 1997 [JP] Japan ..................... 9-002358

[51] Int. Cl.⁷ ..................... G06F 17/50
[52] U.S. Cl. ..................... 395/500.23; 345/420
[58] Field of Search ............ 364/578; 395/500.23; 345/420

[56] References Cited

U.S. PATENT DOCUMENTS

| | | | |
|---|---|---|---|
| 4,858,150 | 8/1989 | Aizawa et al. | 345/420 |
| 5,268,999 | 12/1993 | Yokoyama | 345/441 |
| 5,444,838 | 8/1995 | Kommrusch et al. | 345/441 |
| 5,596,504 | 1/1997 | Tata et al. | 364/468.27 |
| 5,742,288 | 4/1998 | Nishizaka et al. | 345/418 |
| 5,745,117 | 4/1998 | Masuda et al. | 345/420 |

*Primary Examiner*—Kevin J. Teska
*Assistant Examiner*—Hugh Jones
*Attorney, Agent, or Firm*—Staas & Halsey LLP

[57] ABSTRACT

An apparatus automatically generates a solid model from a plurality of plan views. The apparatus includes an extraction unit for extracting information related to surfaces from the plan views, a first generation unit for generating candidate surfaces based on the information extracted by the extraction unit, a second generation unit for generating candidate surfaces and candidate edge lines by obtaining intersecting lines among the candidate surfaces generated by the first generation unit, a third generation unit for generating candidate solids by determining combinations of the candidate surfaces generated by the second generation unit, and a selection unit for collating the candidate solids generated by the third generation unit with the plan views and selecting a matching candidate solid as a solid model.

21 Claims, 11 Drawing Sheets

METHOD AND APPARATUS FOR AUTOMATICALLY GENERATING SOLID MODEL AND COMPUTER READABLE STORAGE MEDIUM

BACKGROUND OF THE INVENTION

1. Technical Field of the Invention

The present invention generally relates to a method and apparatus for automatically generating solid models and to a computer readable storage medium storing programs for automatically generating solid models, and more particularly, to a method and an apparatus for automatically generating a solid model from a plurality of plan views such as front, side, top and bottom views, and to a computer readable storage medium which stores a program for automatically generating a solid model by use of the method.

2. Related Art

Three plan views selected from views such as front, side, top and bottom views are often used to describe a three-dimensional object. By use of such plan views, the three dimensional object can be described using a three-dimensional computer aided design (CAD) system.

However, it requires complicated operations to input necessary information to the CAD system, and there are demands to automatically generate a three-dimensional object from three plan views.

Conventionally, there is a first technique which automatically generates a three dimensional object, that is, a solid model, from three plan views. This first technique obtains candidates of apexes from the three plan views, and then obtains candidates of edge lines from the candidates of the apexes. A wire frame model is generated based on the candidates of the apexes and the candidates of the edge lines. Next, a surface model having surfaces surrounded by the edge lines is generated. Finally, a solid model is generated by determining which side of each surface of the surface model the object exists.

On the other hand, there is a second technique which prepares within a system basic shapes such as a parallepiped, cylinder and cone shapes. This second technique retrieves loops or closed sequences of line segments in each of the three plan views. Then, a correspondence among the retrieved loops in each of the plan views is obtained, so as to successively create the basic shapes.

According to the first and second techniques described above, it is a precondition that the geometrical shape is strictly drawn on the three plan views. But in actual mechanical drawings, simplified drawings including the following simplifications are used as the base.

(1) Complicated interpenetrating lines are approximated by straight or arcuate lines; and (2) Shapes and the like of tools and jigs used for the process are only drawn by imaginary lines, and edge lines which are generated as a result are omitted.

The three plan views including the simplifications (1) and (2) described above are mainly used to process and produce the object. In addition, machine tools such as lathes and milling machines are used to process surfaces of the object. On the other hand, information that is accurately drawn on the three plan views relates to the shape of the surfaces and not to the shape of the edge lines. For these reasons, there was a problem in that it is impossible to generate a correct solid model according to the first technique or the second technique described above.

SUMMARY OF THE INVENTION

Accordingly, it is a general object of the present invention to provide a novel and useful method and apparatus for automatically generating a solid model and to a computer readable storage medium storing a program for automatically generating a solid model, in which the problem described above is eliminated.

Another and more specific object of the present invention is to provide a method and apparatus for automatically generating a solid model and to a computer readable storage medium storing a program for automatically generating a solid model, wherein a correct solid model can be generated automatically by extracting surface information from three plan views even if the three plan views are simplified diagrams.

Still another object of the present invention is to provide an apparatus for automatically generating a solid model from a plurality of plan views, comprising extraction means for extracting information related to surfaces from the plan views, first generation means for generating candidate surfaces based on the information extracted by the extraction means, second generation means for generating candidate surfaces and candidate edge lines by obtaining intersecting lines among the candidate surfaces generated by the first generation means, third generation means for generating candidate solids by determining combinations of the candidate surfaces generated by the second generation means, and selection means for collating the candidate solids generated by the third generation means with the plan views and selecting a matching candidate solid as a solid model. According to the apparatus of the present invention, it is possible to automatically generate a correct solid model by extracting surface information from the plan views, even if the plan views are simplified views.

A further object of the present invention is to provide a computer-implemented method for automatically generating a solid model from a plurality of plan views, comprising the steps of (a) extracting information related to surfaces from the plan views, (b) generating candidate surfaces based on the information extracted by the step (a), (c) generating candidate surfaces and candidate edge lines by obtaining intersecting lines among the candidate surfaces generated by the step (b), (d) generating candidate solids by determining combinations of the candidate surfaces generated by the step (c), and (e) collating the candidate solids generated by the step (d) with the plan views and selecting a matching candidate solid as a solid model. According to the computer-implemented method of the present invention, it is possible to automatically generate a correct solid model by extracting surface information from the plan views, even if the plan views are simplified views.

Another object of the present invention is to provide a computer readable storage medium storing a program to be executed by a computer, comprising extraction means for causing the computer to extract information related to surfaces from the plan views, first generation means for causing the computer to generate candidate surfaces based on the information extracted by the extraction means, second generation means for causing the computer to generate candidate surfaces and candidate edge lines by obtaining intersecting lines among the candidate surfaces generated by the first generation means, third generation means for causing the computer to generate candidate solids by determining combinations of the candidate surfaces generated by the second generation means, and selection means for causing the computer to collate the candidate solids generated by the third generation means with the plan views and to select a matching candidate solid as a solid model. According to the computer readable storage medium of the present invention, it is possible to cause the computer to automatically generate a correct solid model by extracting surface information from the plan views, even if the plan views are simplified views.

Other objects and further features of the present invention will be apparent from the following detailed description when read in conjunction with the accompanying drawings.

DESCRIPTION OF THE PREFERRED EMBODIMENTS

Figure 1:
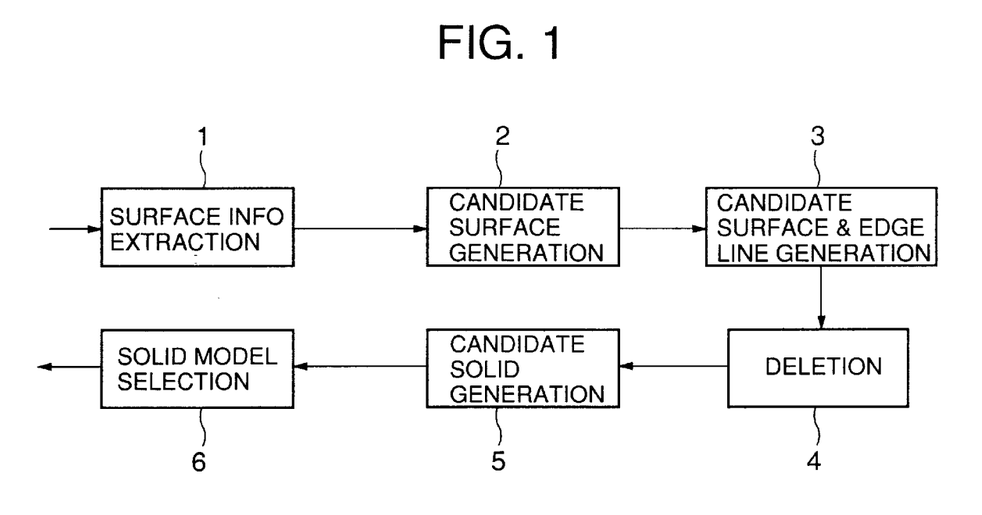
FIG. 1 is a system block diagram showing an embodiment of a solid model generating apparatus according to the present invention.

FIG. 1 is a system block diagram showing an embodiment of a solid model generating apparatus according to the present invention. The solid model generating apparatus generally includes a surface information extraction unit 1, a candidate surface generation unit 2, a candidate surface and edge line generation unit 3, a deletion unit 4, a candidate solid generation unit 5, and a solid model selection unit 6.

The surface information extraction unit 1 provisionally extracts information related to surfaces of a three-dimensional object, that is, a solid model to be generated, based on three plan views selected from top, bottom, right side, left side, front and rear views of the object. The candidate surface generation unit 2 generates candidate surfaces based on the information related to the surfaces. The candidate surface and edge line generation unit 3 obtains intersecting lines among the candidate surfaces and generates candidate surfaces or candidate edge lines.

The deletion unit 4 deletes a candidate surface or a candidate edge line which cannot possibly exist in the solid. The candidate solid generation unit 5 determines combinations of the surfaces and generates candidate solids. The solid model selection unit 6 collates the candidate solids with the three plan views, and selects a correct solid as the solid model.

When collating the candidate solids with the three plan views, the solid model selection unit 6 judges a match when projections of the candidate solid on the three plan views fall within predetermined boxes. Accordingly, even if the three plan views are simplified drawings, it is possible to extract the surface information from the three plan views and automatically generate a correct solid model.

Figure 2:
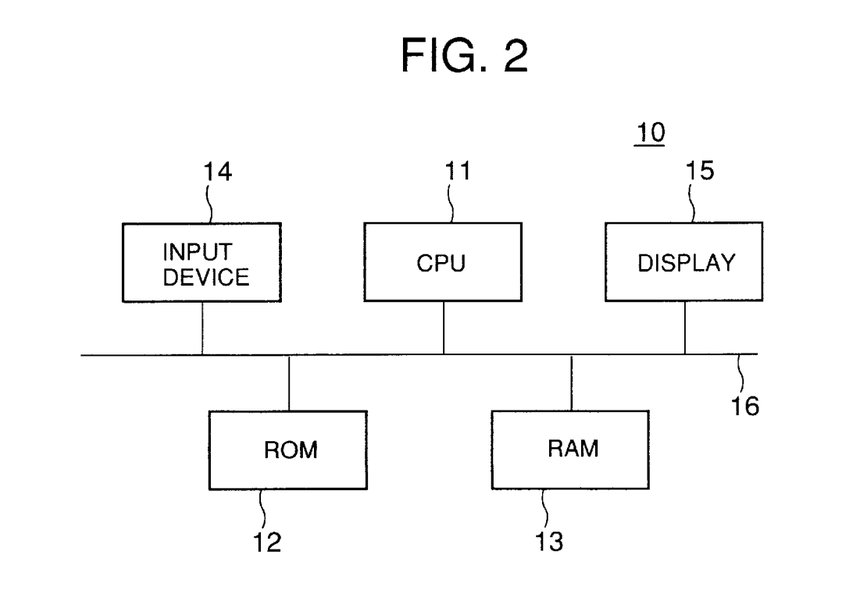
FIG. 2 is a system block diagram showing a computer system which realizes the functions of the solid model generating apparatus shown in FIG. 1 by software.

FIG. 2 is a system block diagram showing a computer system which realizes the functions of the solid model generating apparatus shown in FIG. 1 by software. In FIG. 2, a computer system includes a central processing unit (CPU) 11, a read only memory (ROM) 12, a random access memory (RAM) 13, an input device 14 such as a keyboard and a mouse, and a display unit 15 which are coupled via a bus 16.

The CPU 11 executes programs stored in the ROM 12 in response to an instruction input from the input device 14. Various data including intermediate data which are obtained during operations carried out by the CPU 11 are stored in the RAM 13. An output which is obtained as a result of executing a program by the CPU 11 is displayed on the display 15. Of course, a single storage unit may be used as the ROM 12 and the RAM 13. A computer system having a known construction may be used as this computer system 10.

The computer system 10 automatically generates a solid model using an embodiment of a solid model generating method according to the present invention. In addition, the ROM 12 forms an embodiment of a computer readable storage medium according to the present invention which stores a program for automatically generating a solid model by use of the solid model generating method.

Of course, the computer readable storage medium according to the present invention is not limited to the ROM 12, but may be any kind of computer readable semiconductor memory device such as ROM, RAM, PROM, EPROM and EEPROM, computer readable disks such as magnetic, optical and magneto-optic disks, and computer readable cards or the like suitable for storing a program for carrying out the solid model generating method according to the present invention. It goes without saying that if a magnetic disk is used as the ROM 12, a known magnetic disk drive is coupled to the bus 16 and the magnetic disk is loaded into the magnetic disk drive.

Figure 3:
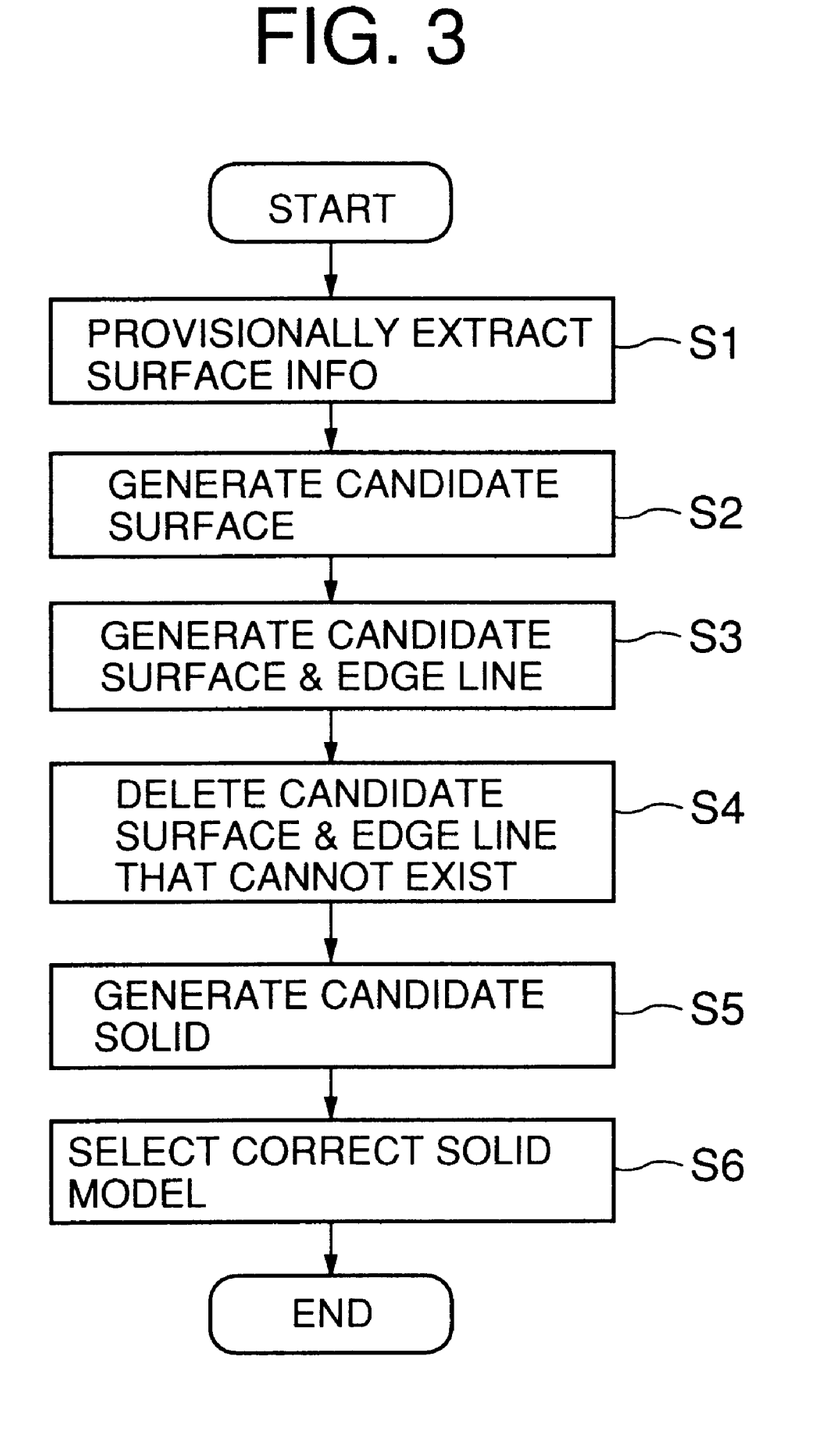
FIG. 3 is a flow chart for explaining the basic operation of the embodiment.

FIG. 3 is a flow chart for explaining the basic operation of this embodiment. The operation shown in FIG. 3 is carried out by the computer system 10 shown in FIG. 2, and corresponds to the embodiment of the solid model generating method.

In FIG. 3, a step S1 provisionally extracts the surface information from the three plan views, and a step S2 generates the candidate surfaces based on the surface information. A step S3 obtains intersecting lines among the candidate surfaces, and generates candidate surfaces or candidate edge lines. A step S4 deletes a candidate surface or a candidate edge line which cannot possibly exist in the solid. A step S5 determines combinations of the surfaces and generates candidate solids. A step S6 collates the candidate solids with the three plan views, and selects a correct solid as the solid model.

The step S1 corresponds to the operation of the surface information extraction unit 1, and the step S2 corresponds to the operation of the candidate surface generation unit 2. The step S3 corresponds to the candidate surface and edge line generation unit 3, and the step S4 corresponds to the operation of the deletion unit 4. The step S5 corresponds to the operation of the candidate solid generation unit 5, and the step S6 corresponds to the operation of the solid model selection unit 6.

Figure 4:
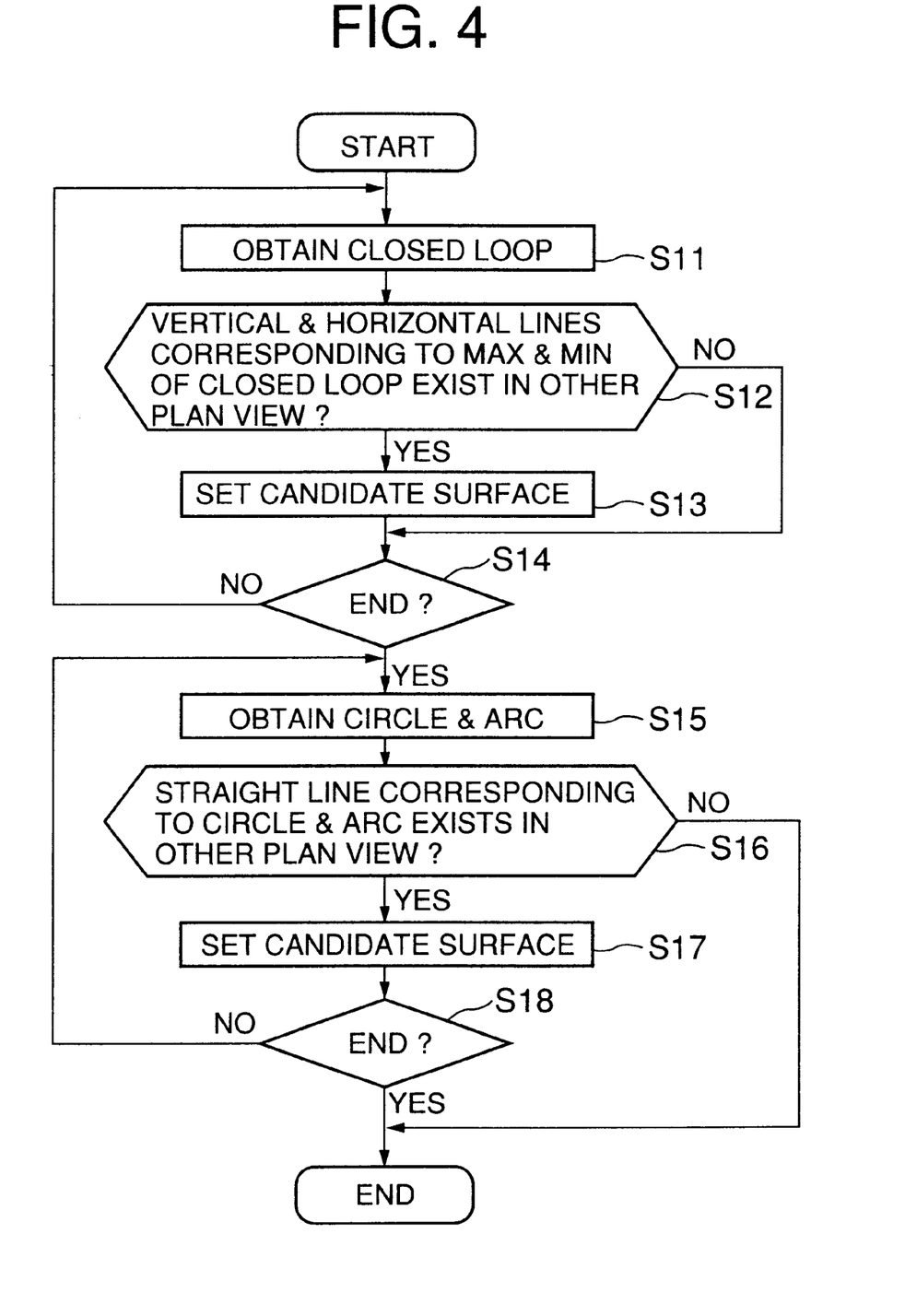
FIG. 4 is a flow chart for explaining the operation of steps S1 and S2 shown in FIG. 3 in more detail.

FIG. 4 is a flow chart for explaining the operation of the steps S1 and S2 shown in FIG. 3 in more detail.

In FIG. 4, a step S11 obtains a closed loop from a specified one of the three plan views. For example, a closed loop L1 of a side view shown in FIG. 6A which will be described later is obtained by this step S11.

A step S12 decides whether or not vertical or horizontal lines corresponding to a maximum and a minimum of the closed loop exist in the other plan views. For example, a decision to determine whether or not surfaces L2 and L3 respectively corresponding to the front and top views which are the other plan views corresponding to the maximum and minimum of the closed loop L1 in the side view shown in FIG. 6A and obtained in the step S11 exist is made this step S12.

If the decision result in the step S12 is YES, a step S13 sets the closed loop obtained in the step S11 as a candidate surface, and the process advances to a step S14. On the other hand, the process advances to the step S14 without setting the closed loop obtained in the step S11 as the candidate surface if the decision result in the step S12 is NO.

The step S14 decides whether or not the end of the specified plan view is reached and all of the closed loops in the specified plan view are obtained. The process advances to a step S15 if the decision result in the step S14 is YES. However, the process returns to the step S11 if the decision result in the step S14 is NO, so as to repeat the steps S11 through S14.

By carrying out the above described steps S11 through S14, the closed loops are obtained from the specified plan view, and the candidate surface is obtained if the vertical or horizontal lines corresponding to the maximum and minimum of each closed loop exist in the other plan views, thereby generating the candidate surface of the plane from the three plan views.

The step S15 obtains a circle or arc from the specified plan view. For example, A circle L1a of a side view shown in FIG. 6C which will be described later is obtained by this step S15.

A step S16 decides whether or not a straight line corresponding to a contour line of the circle or arc exists in the other plan views. For example, a decision to determine whether or not straight lines L2a and L3a corresponding to the contour line of the circle L1a in the side view shown in FIG. 6C and obtained in the step S15 exists in the front and top views which are the other plan views is made in the step S16.

If the decision result in the step S16 is YES, a step S17 sets the circle or arc obtained in the step S15 as a candidate surface, and the process advances to a step S18. On the other hand, the process ends without setting the circle or arc obtained in the step S15 as the candidate surface if the decision result in the step S16 is NO.

The step S18 decides whether or not the end of the specified plan view is reached and all of the circles and arcs in the specified plan view are obtained. The process ends if the decision result in the step S18 is YES. On the other hand, the process returns to the step S15 if the decision result in the step S18 is NO, so as to repeat the steps S15 through S18.

By carrying out the above described steps S15 through S18, the circles and arcs are obtained from the specified plan view, and the candidate surface is obtained if the straight lines corresponding to the contour of the circle or arc exist in the other plan views, thereby generating the candidate surface of cylindrical surface from the three plan views.

Similarly, it is possible to generate the candidate surfaces with respect to a cone, sphere, and ring surface in addition to the plane and the cylindrical surface described above. The "plane" is parallel to one surface and perpendicular to other two surfaces or, perpendicular to one surface and non-perpendicular to and non-parallel to other two surfaces or, non-parallel to and non-perpendicular to all of three surfaces. The "cylindrical surface" has a center axis perpendicular to one of surfaces. The "cone" has a center axis perpendicular to one of surfaces. The "sphere" and "ring surface" respectively have a center axis perpendicular to one of surfaces.

Figure 5:
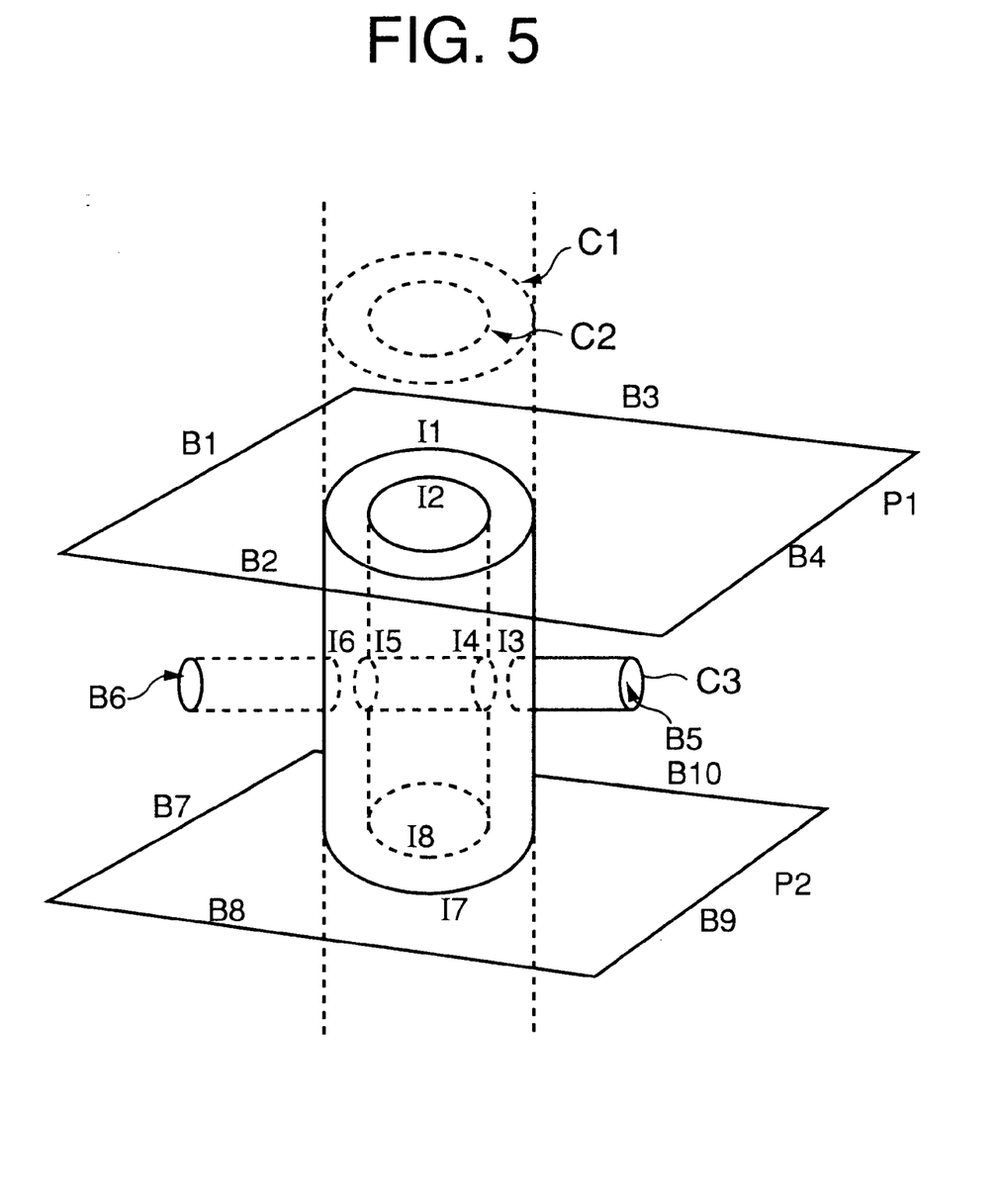
FIG. 5 is a perspective view showing an original solid.

FIG. 5 is a perspective view showing an original solid. FIGS. 6A through 6D are diagrams showing candidate surfaces extracted from the three plan views of the original solid shown in FIG. 5.

In FIG. 5, B1 through B10 denote boundary lines of contour edge lines, and I1 through I8 denote dimension lines of candidate edge lines. In addition, P1 and P2 denote planes, and C1, C2 and C3 denote cylinders. The original solid shown in FIG. 5 has a hollow cylindrical shape, and this original solid can be described by the three plan views, namely, the front, top and side views, as shown in FIG. 6A.

A description will be given of the surface extraction by referring to the three plan views, that is, the front, top and side views, of the original solid shown in FIG. 5, by referring to FIGS. 6A through 6D.

Figure 6A:
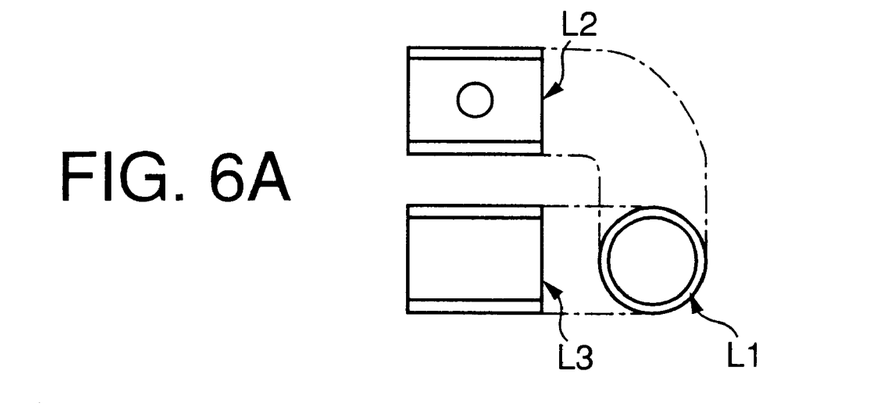
FIGS. 6A through 6D are diagrams showing candidate surfaces extracted from the three plan views of the original solid shown in FIG. 5.

FIG. 6A is a diagram for explaining the extraction of the plane from the three plan views. FIG. 6A shows a state where the closed loop L1 of the side view is obtained, the vertical or horizontal line corresponding to the maximum and the minimum of the closed loop L1 exists in the other plan views (that is, the top and side views), and the candidate surface of the plane is generated, by carrying out the steps S11 through S14 shown in FIG. 4.

Figure 6B:
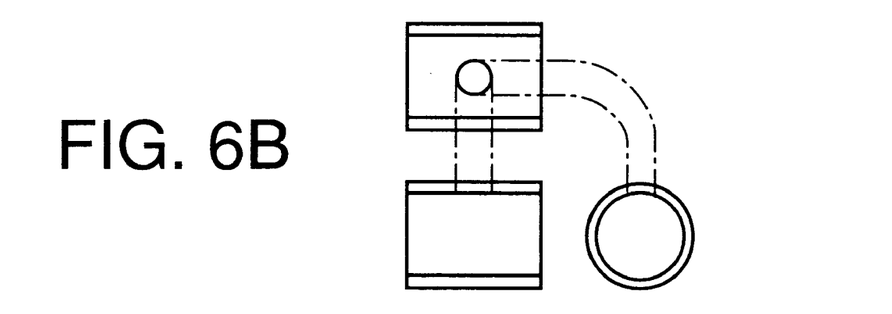
Figure 6C:
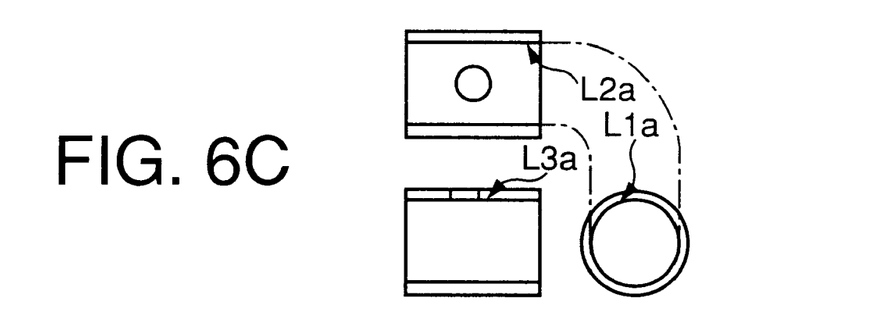
Figure 6D:
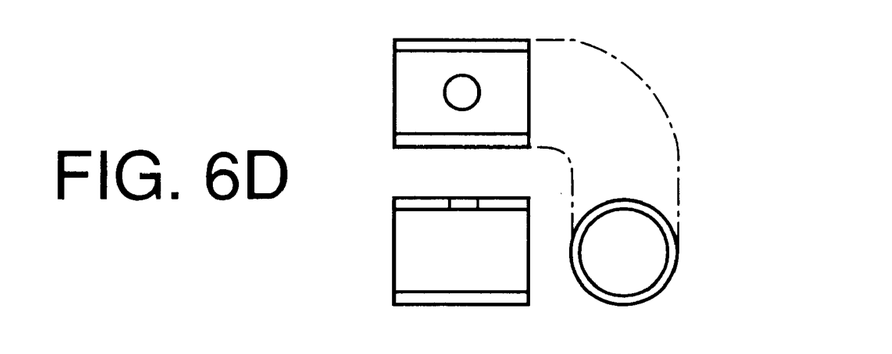

FIGS. 6B through 6D are diagrams for explaining the extraction of the cylindrical surface from the three plan views. FIGS. 6B through 6D show a state where the circle or arc L1a of the side view in FIG. 6C is obtained, the straight line corresponding to the contour line of the circle or arc L1a exists in the other plan views (that is, the top and side views), and the candidate surface of the cylindrical surface is generated, by carrying out the steps S15 through S18 shown in FIG. 4.

FIG. 6B shows a case where a contour line corresponding to the contour line of the circle in the top view exists in the front and side views, and the candidate surface of the cylindrical surface is obtained.

FIG. 6C shows a case where a contour line corresponding to the contour line of the circle L1a in the side view exists in the front and top views, and the candidate surface of the cylindrical surface is obtained.

FIG. 6D shows a case where a contour line corresponding to the contour line of the circle in the side view exists in the front and top views, and the candidate surface of the cylindrical surface is obtained.

Figure 7:
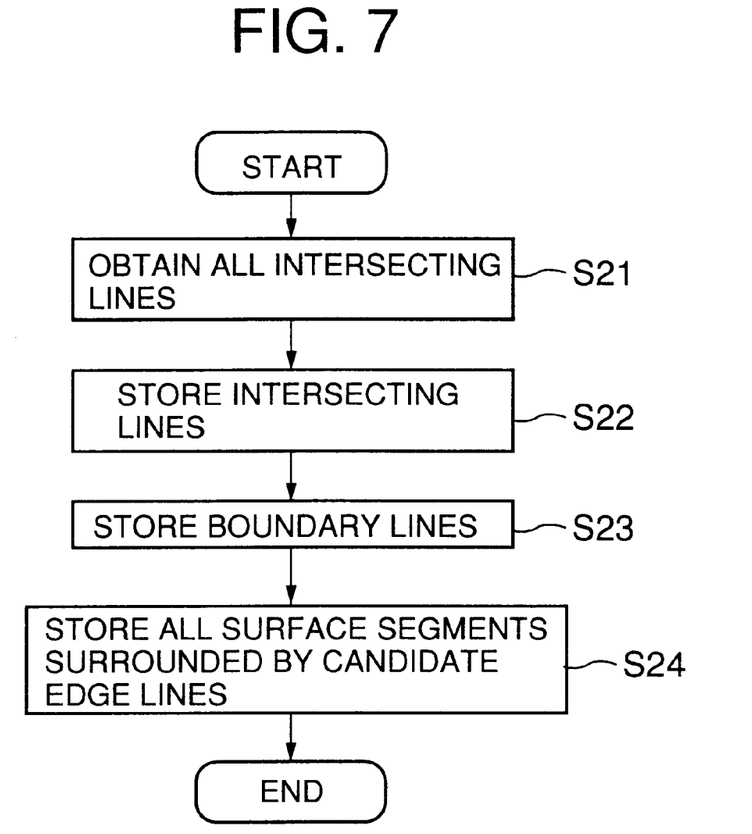
FIG. 7 is a flow chart for explaining the operation of a step S3 shown in FIG. 3 in more detail.

FIG. 7 is a flow chart for explaining the operation of the step S3 shown in FIG. 3 in more detail.

In FIG. 7, a step S21 obtains all intersecting lines among the candidate surfaces. All intersecting lines among the candidate surfaces generated by the operation shown in FIG. 4 are obtained. A step S22 stores the intersecting lines obtained in the step S21 in the RAM 13, as candidate edge lines. A step S23 stores boundary lines of the candidate surfaces in the RAM 13, as candidate edge lines. In addition, a step S24 stores all surfaces surrounded by the candidate edge lines in the RAM 13, as candidate surface segments.

Figure 8:
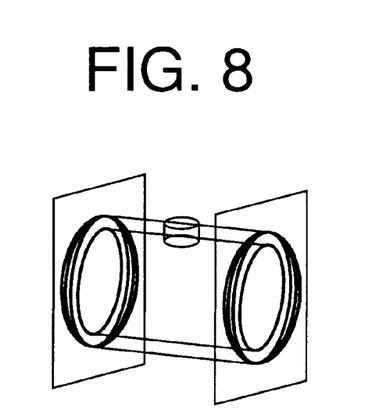
FIG. 8 is a perspective view showing a solid which is stored by the operation shown in FIG. 7.

By carrying out the above described steps S21 through S24, the intersecting lines are obtained with respect to the candidate surfaces which are generated from the three plan views shown in FIGS. 6A through 6D by carrying out the operation shown in FIG. 4. These intersecting lines are stored as the candidate edge lines. In addition, the boundary lines of the candidate surfaces are stored as the candidate edge lines, and all of the surfaces surrounded by the candidate edge lines are stored as the candidate surface segments. As a result, a solid shown in FIG. 8 is obtained, and a total of 17 surface segments are stored.

Figure 9:
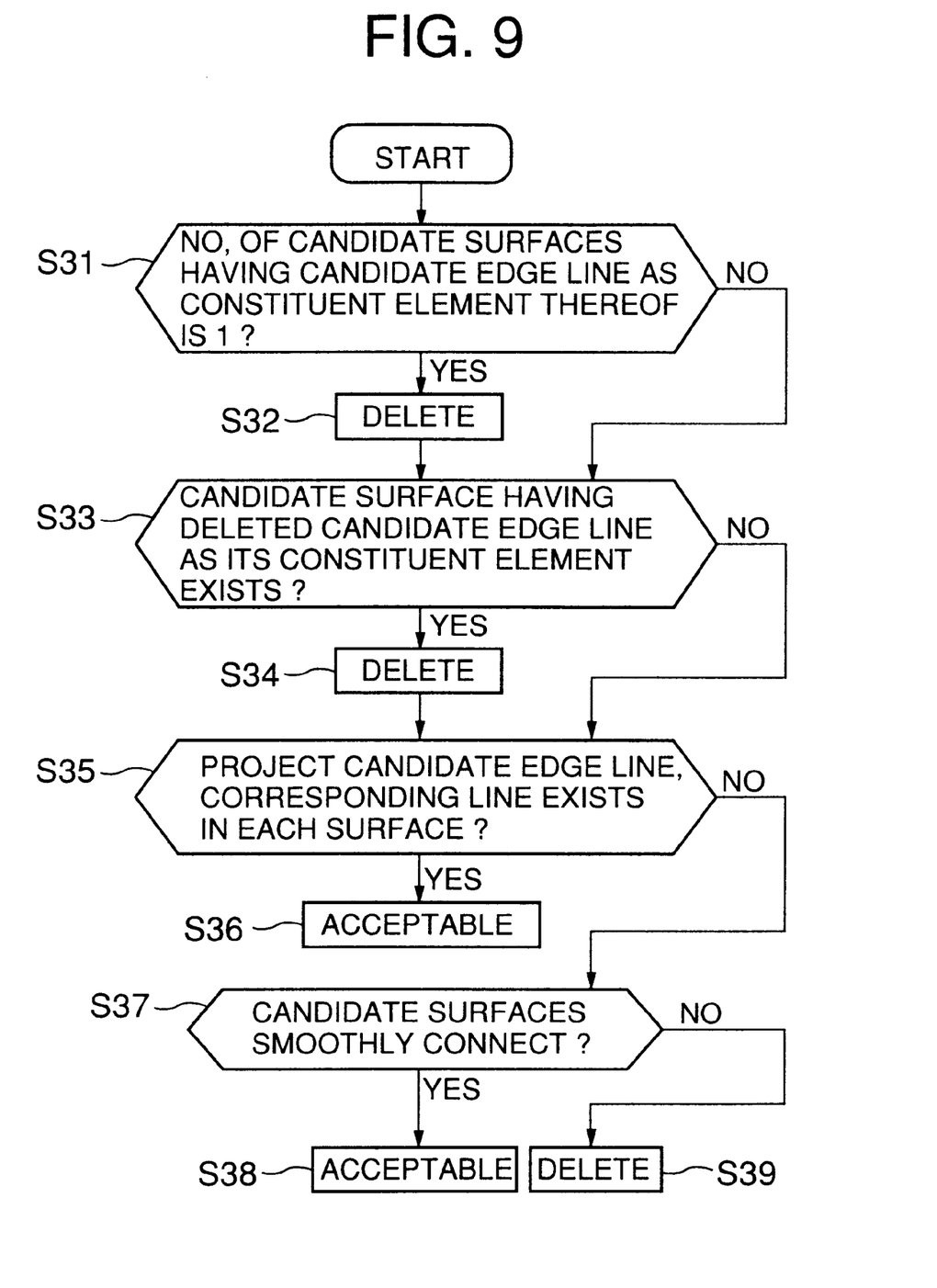
FIG. 9 is a flow chart for explaining the operation of a step S4 shown in FIG. 3 in more detail.

FIG. 9 is a flow chart for explaining the operation of the step S4 shown in FIG. 3 in more detail, that is, an operation of deleting the candidate edge line or surface.

In FIG. 9, a step S31 decides whether or not a condition A is satisfied, that is, whether or not the number of candidate surfaces having the candidate edge lines as constituent elements thereof is one. If the decision result in the step S31 is YES, it is found that there exists only one candidate surface having the candidate edge line as its constituent element, and a step S32 deletes the candidate edge line which clearly does not exist. For example, if the condition A is satisfied with respect to a candidate edge line 100 shown in FIG. 10 which will be described later, the step S32 deletes this candidate edge line 100. On the other hand, the process advances to a step S33 if the decision result in the step S31 is NO.

The step S33 decides whether or not there exists a candidate surface having the deleted candidate edge line as its constituent element. If the decision result in the step S33 is YES, a step S34 deletes this candidate surface having the deleted candidate edge line as its constituent element. For example, when the step S32 deletes the candidate edge line 100 shown in FIG. 10, the step S33 deletes a surface "a" shown in FIG. 10 which is the candidate surface having the deleted candidate edge line 100 as its constituent element. On the other hand, the process advances to a step S35 if the decision result in the step S33 is NO.

The step S35 projects the candidate edge line and decides whether or not a corresponding line exists in each surface. If the decision result in the step S35 is YES, it is found that a line corresponding to each surface of the candidate edge line exists, and a step S36 determines that this candidate edge line is acceptable. On the other hand, the process advances to a step S37 if the decision result in the step S35 is NO.

The step S37 decides whether or not a candidate surface on the surface side of the candidate edge line is smoothly connected, that is, normal vectors of two surfaces traverse the candidate edge line and continuously connect. If the decision result in the step S37 is YES, a step S38 determines that this candidate surface is acceptable. On the other hand, if the decision result in the step S37 is NO, a step S39 deletes this candidate surface.

Therefore, based on the three plan views, it is possible to delete the combinations which do not exist with respect to the candidate edge lines and the candidate surfaces which are generated.

Figure 10:
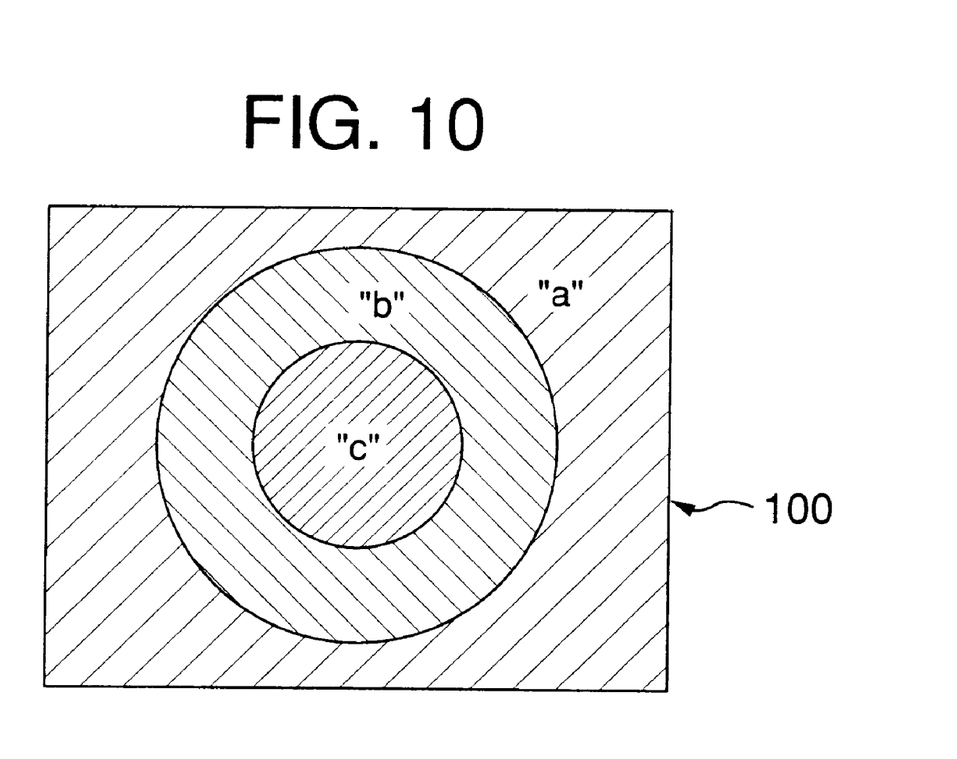
FIG. 10 is a diagram for explaining detection of a candidate surface by the operation shown in FIG. 9.

FIG. 10 is a diagram for explaining the deletion of the candidate surface. FIG. 10 shows candidate surfaces "a", "b" and "c". When the condition A is satisfied, that is, the number of candidate surfaces having the candidate edge lines as constituent elements thereof is one, the candidate edge line 100 shown in FIG. 10 is deleted. By deleting this candidate edge line 100, the decision result in the step S33 shown in FIG. 9 becomes YES, and the surface "a" is deleted in the step S34. The combinations which do not exist with respect to the candidate edge lines and the candidate surfaces which are generated are deleted in this manner based on the three plan views.

Figure 11:
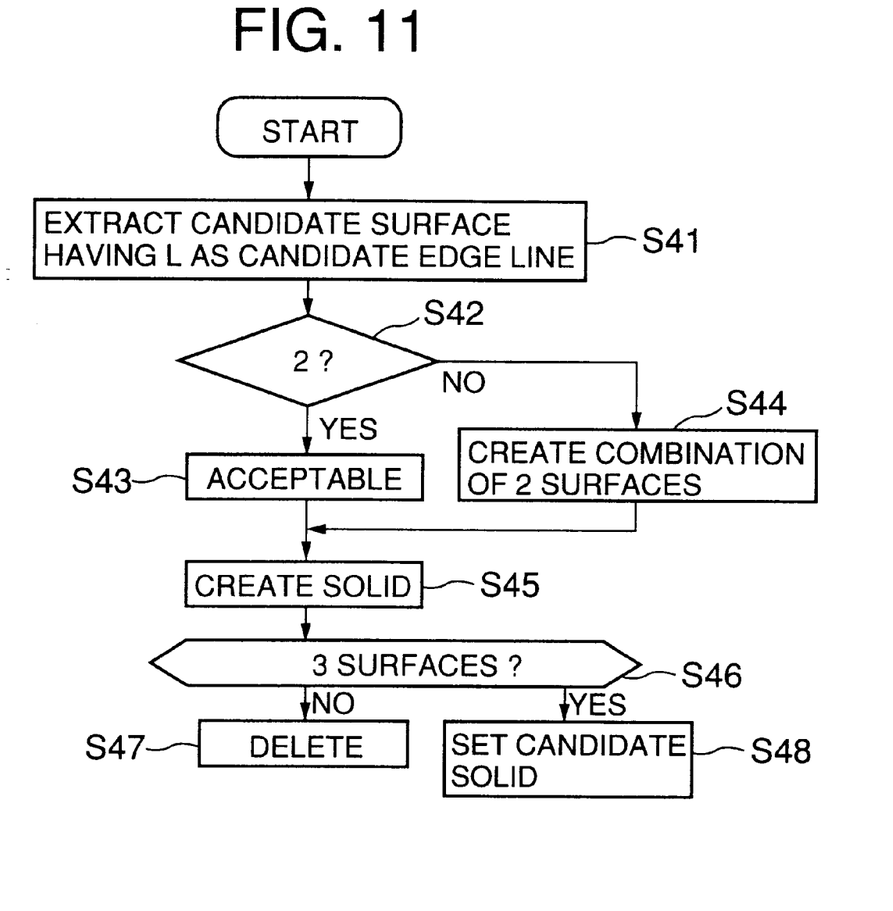
FIG. 11 is a flow chart for explaining the operation of the steps S4 and S5 shown in FIG. 3 for a particular case.

FIG. 11 is a flow chart for explaining the operation of the steps S4 and S5 shown in FIG. 3 for a particular case. In addition, FIG. 12 is a perspective view showing surfaces for explaining the operation shown in FIG. 11.

Figure 12:
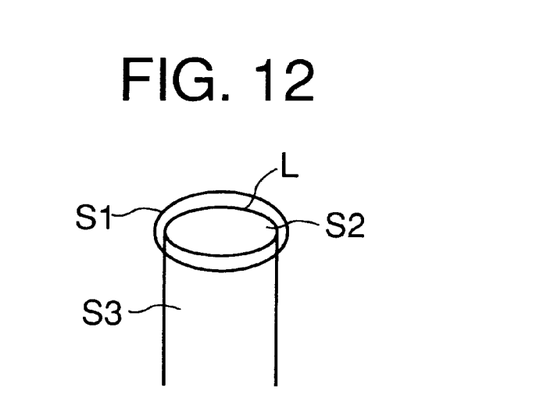
FIG. 12 is a perspective view showing candidate surfaces for explaining the operation shown in FIG. 11.

In FIG. 11, a step S41 extracts a candidate surface having a candidate edge line L shown in FIG. 12 as its candidate edge line. Hence, in the case shown in FIG. 12, the step S41 extracts candidate surfaces S1, S2 and S3 respectively having the candidate edge line L as their candidate line.

A step S42 decides whether or not the number of candidate surfaces extracted in the step S41 is 2. A step S43 determines that the extracted candidate surfaces are acceptable if the decision result in the step S42 is YES. On the other hand, if the decision result in the step S42 is NO, a step S44 creates a combination of 2 candidate surfaces.

After the step S43 or S44, a step S45 creates a solid based on the information obtained from the three plan views. In other words, the step S45 creates a combination of the surfaces which can exist as a solid.

A step S46 decides whether or not 3 surfaces exist on the created solid. If the decision result in the step S46 is NO, a step S47 deletes the created solid. On the other hand, if the decision result in the step S46 is YES, a step S48 sets the created solid as a candidate solid.

Figure 13:
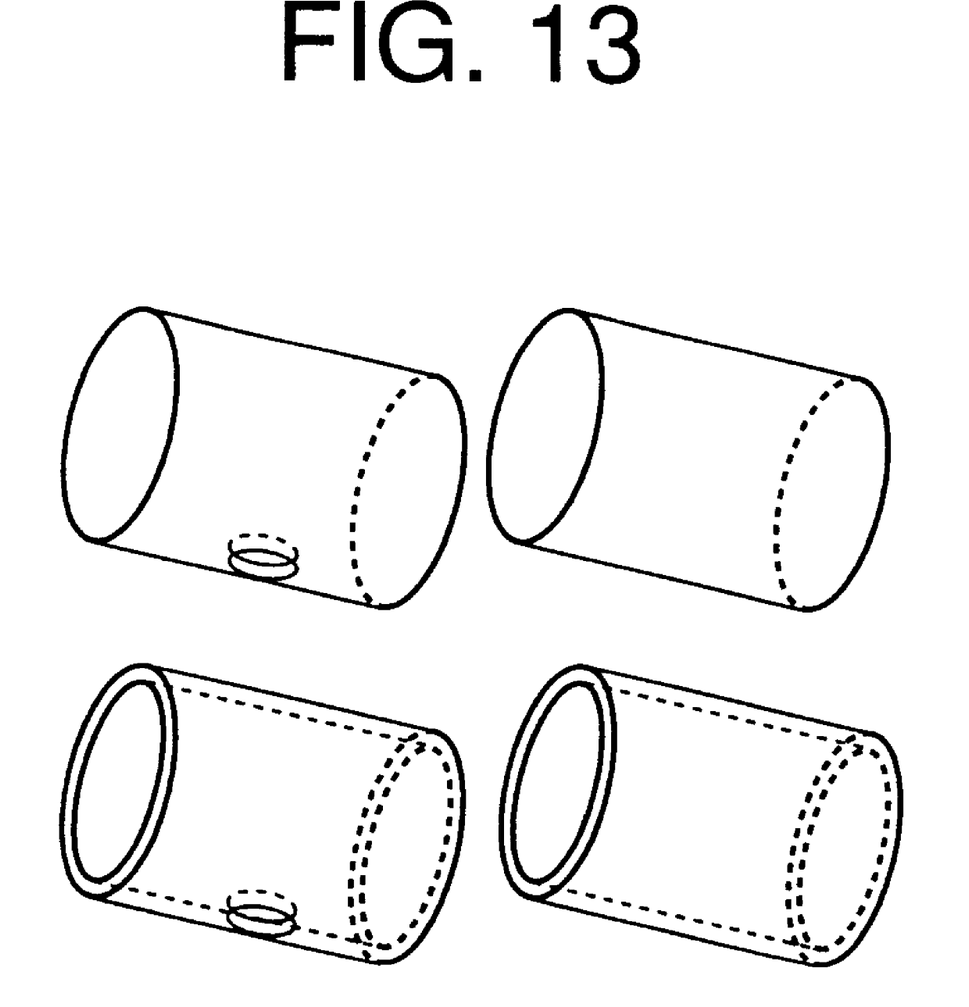
FIG. 13 is a perspective view showing 4 combinations which are obtained by the operation shown in FIG. 11 with respect to the original solid shown in FIG. 5.

Therefore, based on the candidate edge lines and the candidate surfaces which are generated from the three plan views, all combinations of the surfaces which can exist as a solid are generated. For example, in the case of the original solid shown in FIG. 5, 4 combinations are generated as shown in FIG. 13.

Figure 14:
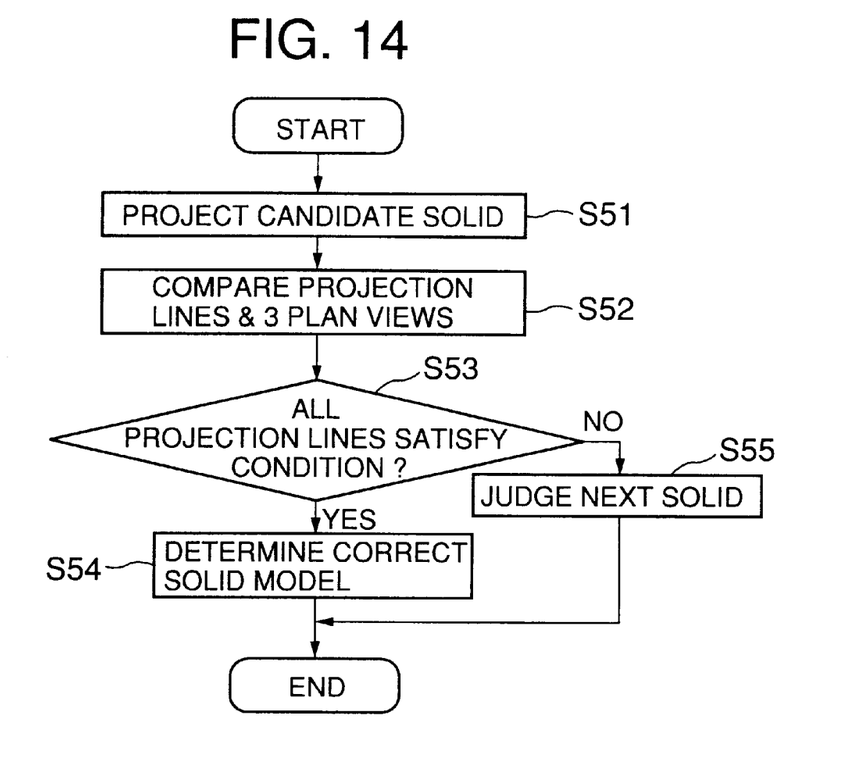
FIG. 14 is a flow chart for explaining the operation of a step S6 shown in FIG. 3 in more detail.

FIG. 14 is a flow chart for explaining the operation of the step S6 shown in FIG. 3 in more detail.

In FIG. 14, a step S51 projects the generated candidate solid. More particularly, the candidate solid (or model) generated by the step S48 shown in FIG. 11 is projected on the three plan views. A step S52 compares the projection lines and the figures in the three plan views for all of the elements of the three plan views.

A step S53 decides whether or not all projection lines satisfy a predetermined condition. If the decision result in the step S53 is YES, the projection lines which are obtained by projecting the generated candidate model on the three plan views satisfy the predetermined condition, and it is judged that the projection lines match corresponding lines on the three plan views. Hence, if the decision result in the step S53 is YES, a step S54 determines that the generated candidate solid is a correct solid model. On the other hand, if the decision result in the step S53 is NO, a step S55 starts to judge the next candidate solid.

Figure 15A:
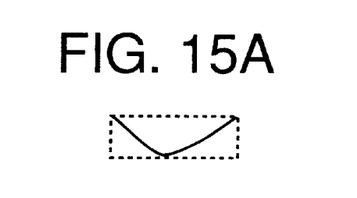
FIGS. 15A and 15B respectively are diagrams for explaining a box.
Figure 15B:
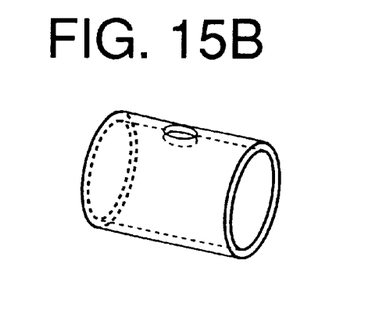

FIGS. 15A and 15B respectively are diagrams for explaining a box. FIG. 15A shows a box which is used to judge whether or not the candidate solid matches the drawing on the three plan views when the candidate solid is projected on the three plan views. This rectangular box shown in FIG. 15A is used to judge whether or not the elements on the three plan views fall within this box when judging the match between the candidate solid and the drawing on the three plan views. FIG. 15A shows the box which is used by the operation shown in FIG. 14 when determining whether or not the projection lines of the generated candidate solid projected on the three plan views satisfy the predetermined condition.

FIG. 15B shows a solid which matches the drawing on the three plan views. FIG. 15B shows the solid model which matches the drawing on the three plan views shown in FIGS. 6A through 6D when the 4 candidate solids shown in FIG. 13 are collated with the three plan views shown in FIGS. 6A through 6D.

When collating the candidate solid and the drawing on the three plan views in the operation shown in FIG. 14, the collating operation may be carried out based on a polygon which circumscribes a collating portion of the candidate solid which is the subject of the collating operation when projecting the collating portion of the candidate solid on the three plan views.

Further, the present invention is not limited to these embodiments, but various variations and modifications may be made without departing from the scope of the present invention.

What is claimed is:

1. An apparatus for automatically generating a solid model from a plurality of plan views, comprising:

extraction means for extracting information related to surfaces from the plan views;

first generation means for generating candidate surfaces based on the information extracted by said extraction means;

second generation means for generating candidate surfaces and candidate edge lines by obtaining intersecting lines among the candidate surfaces generated by said first generation means after the candidate surfaces are generated by said first generation means;

third generation means for generating candidate solids by determining combinations of the candidate surfaces generated by said second generation means after the candidate surfaces are generated by said second generation means; and selection means for collating the candidate solids generated by said third generation means with the plan views and selecting a matching candidate solid as a solid model after the candidate solids are generated by said third generation means.

2. The apparatus as claimed in claim 1, which further comprises:

deletion means for deleting, out of the candidate surfaces and the candidate edge lines generated by said second generation means, at least one of a candidate surface and a candidate edge line which cannot possibly exist in a solid.

3. The apparatus as claimed in claim 2, wherein said selection means carries out a collating operation based on a polygon which circumscribes a collating portion of each of the candidate solids which are subject to the collating operation when projecting the collating portion of each of the candidate solids on the three plan views.

4. The apparatus as claimed in claim 1, wherein said selection means carries out a collating operation based on a polygon which circumscribes a collating portion of each of the candidate solids which are subject to the collating operation when projecting the collating portion of each of the candidate solids on the three plan views.

5. The apparatus as claimed in claim 1, wherein the plan views are three plan views selected from a group comprising a top view, a bottom view, a right side view, a left side view, a front view and a rear view.

6. A computer-implemented method for automatically generating a solid model from a plurality of plan views, comprising the steps of:

(a) extracting information related to surfaces from the plan views;

(b) generating candidate surfaces based on the information extracted by said step (a);

(c) generating, after said step (b), candidate surfaces and candidate edge lines by obtaining intersecting lines among the candidate surfaces generated by said step (b);

(d) generating, after said step (c), candidate solids by determining combinations of the candidate surfaces generated by said step (c); and (e) collating, after said step (d), the candidate solids generated by said step (d) with the plan views and selecting a matching candidate solid as a solid model.

7. The computer-implemented method as claimed in claim 6, which further comprises the steps of:

(f) deleting, out of the candidate surfaces and the candidate edge lines generated by said step (c), at least one of a candidate surface and a candidate edge line which cannot possibly exist in a solid.

8. The computer-implemented method as claimed in claim 7, wherein said step (e) carries out a collating operation based on a polygon which circumscribes a collating portion of each of the candidate solids which are subject to the collating operation when projecting the collating portion of each of the candidate solids on the three plan views.

9. The computer-implemented method as claimed in claim 6, wherein said step (e) carries out a collating operation based on a polygon which circumscribes a collating portion of each of the candidate solids which are subject to the collating operation when projecting the collating portion of each of the candidate solids on the three plan views.

10. The method as claimed in claim 6, wherein the plan views are three plan views selected from a group comprising a top view, a bottom view, a right side view, a left side view, a front view and a rear view.

11. A computer readable storage medium storing a program to be executed by a computer, comprising:

extraction means for causing the computer to extract information related to surfaces from the plan views;

first generation means for causing the computer to generate candidate surfaces based on the information extracted by said extraction means;

second generation means for causing the computer to generate candidate surfaces and candidate edge lines by obtaining intersecting lines among the candidate surfaces generated by said first generation means after the computer is caused to generate the candidate surfaces by said first generation means;

third generation means for causing the computer to generate candidate solids by determining combinations of the candidate surfaces generated by said second generation means after the computer is caused to generate the candidate surfaces by said second generation means; and selection means for causing the computer to collate the candidate solids generated by said third generation means with the plan views and to select a matching candidate solid as a solid model after the computer is caused to generate the candidate solids by said third generation means.

12. The computer readable storage medium as claimed in claim 11, which further comprises:

deletion means for causing the computer to delete, out of the candidate surfaces and the candidate edge lines generated by said second generation means, at least one of a candidate surface and a candidate edge line which cannot possibly exist in a solid.

13. The computer readable storage medium as claimed in claim 12, wherein said selection means causes the computer to carry out a collating operation based on a polygon which circumscribes a collating portion of each of the candidate solids which are subject to the collating operation when projecting the collating portion of each of the candidate solids on the three plan views.

14. The computer readable storage medium as claimed in claim 11, wherein said selection means causes the computer to carry out a collating operation based on a polygon which circumscribes a collating portion of each of the candidate solids which are subject to the collating operation when projecting the collating portion of each of the candidate solids on the three plan views.

15. The computer readable storage medium as claimed in claim 11, wherein the plan views are three plan views selected from a group comprising a top view, a bottom view, a right side view, a left side view, a front view and a rear view.

16. An apparatus automatically generating a solid model from a plurality of plan views, comprising:

an extraction unit extracting information related to surfaces from the plurality of plan views;

a first generation unit generating candidate surfaces based on the information extracted by said extraction unit;

a second generation unit obtaining intersecting lines among the candidate surfaces, and generating modified candidate surfaces, the modified candidate surfaces having candidate edge lines defined by the intersecting lines;

a third generation unit generating candidate solids by determining combinations of the modified candidate surfaces; and a selection unit collating the candidate solids with the plan views and automatically selecting a matching candidate solid from the plan views as a solid model.

17. A computer readable storage medium storing a program controlling a computer by:

extracting information related to surfaces from a plurality of plan views;

generating candidate surfaces based on the information extracted by said extracting;

obtaining intersecting lines among the candidate surfaces, and generating modified candidate surfaces, the modified candidate surfaces having candidate edge lines defined by the intersecting lines;

generating candidate solids by determining combinations of the modified candidate surfaces; and collating the candidate solids with the plan views and automatically selecting a matching candidate solid from the plan views as a solid model.

18. The storage medium as claimed in claim 17, further deleting, out of the modified candidate surfaces, at least one of the modified candidate surfaces having a candidate edge line which cannot possibly exist as a solid.

19. The storage medium as claimed in claim 18, wherein said collating causes the computer to carry out a collating operation based on a polygon which circumscribes a collating portion of each of the candidate solids which are subject to the collating operation when projecting the collating portion of each of the candidate solids on the three plan views.

20. The storage medium as claimed in claim 17, wherein said collating causes the computer to carry out a collating operation based on a polygon which circumscribes a collating portion of each of the candidate solids which are subject to the collating operation when projecting the collating portion of each of the candidate solids on the three plan views.

21. The storage medium as claimed in claim 17, wherein the plan views are three plan views selected from a group comprising a top view, a bottom view, a right side view, a left side view, a front view and a rear view.

* * * * *